UNITED STATES PATENT OFFICE.

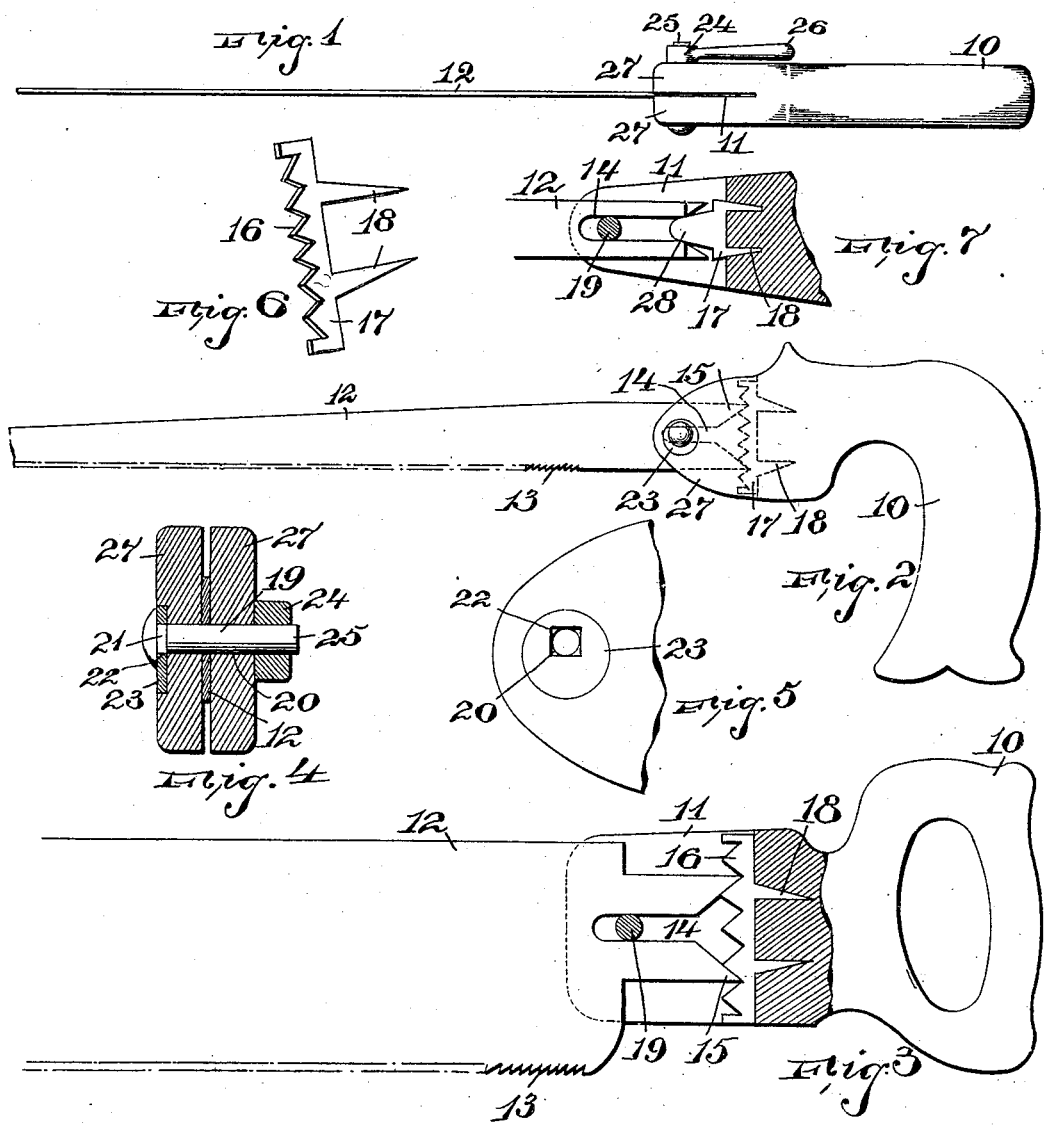

ROBERT E. MARTIN, OF NEWARK, NEW JERSEY.

ADJUSTABLE AND DETACHABLE HANDLE FOR SAWS.

938,680.  Specification of Letters Patent.  Patented Nov. 2, 1909.

Application filed November 24, 1908. Serial No. 464,289.

*To all whom it may concern:*

Be it known that I, ROBERT E. MARTIN, a citizen of the United States, residing at Newark, in the county of Essex and State of New Jersey, have invented certain new and useful Improvements in Adjustable and Detachable Handles for Saws; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved saw which comprises a blade and a handle which are adjustable to each other, and one in which the adjustment permits of the withdrawal of the blade from the handle.

The device also embodies a construction that permits the removable and adjustable blade to be fixed at various angles to the handle so that, under certain conditions, that is, in corners and similar situations, the handle can be changed in its relation to the blade so as to make the saw easier of manipulation.

The invention also consists in a construction of clamping means that is automatically locked against rotation, but can be manually manipulated to release or fasten the saw blade to the handle.

The device further embodies a handle and saw that can be reversed so that the saw teeth can be pointed upward or downward.

Another object of the invention is to provide an improved saw blade of the reversible kind, which has teeth of different constructions on different parts of its cutting edge, and also teeth on the end of the back for purposes to be described hereinafter.

The invention is illustrated in the accompanying drawing, in which—

Figure 1 is a top view of the improved saw. Fig. 2 is a side view of the same. Fig. 3 is a view of a modification with a portion of the handle in section. Fig. 4 is a section through the clamping means. Fig. 5 is a face view of the same with the bolt removed. Fig. 6 is a perspective view of a rack placed in the handle to provide for the securing of the inner end of the blade in its different adjusted positions. Fig. 7 is a section showing a modified form of rack.

The invention comprises any suitable handle 10 which has a slot 11 cut therein which is adapted to receive the end of a blade 12, which blade is provided with suitable teeth 13. The blade 12 is preferably provided with a slot 14 which ends up in the pointed forked ends 15. These pointed inner ends of the blade, when the blade is slid back into the handle, engage the teeth 16 of the rack 17, which rack is also formed with prongs 18 which are preferably integral therewith, and which provide means for the rack being readily driven into the handle and also provide for its secure lodgment therein. A bolt 19 passes through a perforation 20 in the handle, and this bolt has a squared portion 21 which fits in a square recess 22 in a plate 23, which plate can be of any formation, but is preferably circular and has the perforation 22 placed eccentrically thereof so that when the nut 24 on the screw-threaded end 25 of the bolt 19 is screwed up, the bolt is prevented from turning by its squared end being in the plate 23, and the plate is prevented from turning in the recess in which it is set in the handle by reason of its being eccentric to the bolt.

This construction makes a cheap method of fastening the bolt against turning, and prevents the undue driving of pins or screws into the plate 23 and also prevents unnecessary cutting if a rectangular recess has to be made, if the plate were rectangular in contour. When the nut 24 is screwed up, by means of its handle 26, it forces in the two sides 27, as shown in Figs. 1 and 4, and thus clamps the blade in place and prevents its being withdrawn, the teeth 16 preventing the blade from shifting in its angle to the handle. When it is desired, however, to shift the angle of the blade in its relation to the handle, the nut 24 is unloosened and the blade is partly slid out, then shifted to the desired angle and one of the pointed ends of the fork 15 engages a tooth 16, and when the nut 24 is again screwed up tight, the blade is well held in its position. If the screw-threaded end 25, or the face of the side 27 on which the nut 24 bears, becomes worn away and the handle 26, when in its position of locking the blade, projects to a position otherwise than alongside the handle 10, or occupies an angle where it would be in the way of an easy manipulation of the saw, the bolt can be slightly withdrawn and given a half or quarter turn and the squared portion again set back into the recess 22, and thus the position of the handle 26, when at its limit of locking movement, will again be established as shown in Fig. 1. If desired I may replace the rack 17 with its teeth 16 with one having a single tooth 28 as shown in Fig. 7, this however permitting of but one adjustment, but forming a ready means for clamping the slotted end of a blade.

Having thus described my invention, what I claim is:—

1. A saw comprising a handle having a slot in one end, a blade having a slot on its inner end to form a forked end and permit the longitudinal insertion of the blade, a bolt passing through the slotted portion of the handle and adapted to draw the sides of the slot toward each other and being adapted to receive the slot of the blade when the blade is inserted in the handle, and a plate having a tooth thereon for entering the slot in the end of the blade to hold the blade and handle in fixed relation.

2. A saw comprising a handle having a slotted end, a blade pivotally arranged in the slotted end of the handle and removable therefrom the blade having an open-ended slot to form a forked end, and a toothed rack in the end of the slot in the handle, the end of the blade flanking the slot forming teeth for engaging the rack to maintain the handle and blade at different angles.

3. A saw comprising a handle having a slotted end, a blade having an open slot in its end, a bolt passing through the sides of the slotted portion of the handle, the bolt being adapted to receive the slotted end of the blade, means on the bolt for drawing the side pieces of the slotted portion of the handle together, and a rack in the end of the slot in the handle, the teeth of the rack being adapted to receive the fork on the end of the blade.

4. A saw comprising a handle having a slot in one end, a blade having a slot to form a forked end and permit the longitudinal insertion of the blade, a bolt passing through the slot of the blade and the side pieces of the slotted portion of the handle, a nut on the end of the bolt drawing the side pieces together, and a toothed rack in the end of the slot of the handle, the rack having teeth adapted to engage the blade flanking its slot to hold the handle and blade at different angles.

5. A saw comprising a handle having a slot in one end, a blade having a slot to form a forked end, a bolt passing through the slot of the blade and the side pieces of the slotted portion of the handle, a nut on the end of the bolt drawing the side pieces together, and a plate having integral prongs thereon to secure it to the handle and having teeth to form a rack, the teeth being adapted to engage the forked end of the blade to hold the blade and handle at different angles.

6. A saw comprising a handle having a slotted end, a blade in the slotted end of the handle, a bolt passing through the side pieces of the slotted portion of the handle and through the blade, a nut on one end of the bolt to draw the side pieces together, a squared portion on the end of the bolt, and a round plate having a square perforation to receive the squared portion of the bolt, the bolt passing through the plate eccentrically, the handle being recessed to receive the plate, the eccentric location of the bolt preventing the turning of the plate in its recess.

7. A saw comprising a handle having a slotted end, a blade in the slotted end of the handle, a bolt passing through the side pieces of the slotted portion of the handle and through the blade, a nut on one end of the bolt to draw the side pieces together, and a circular plate through which the bolt passes eccentrically of the plate, the handle having a circular recess to receive the plate, the bolt and the plate having co-acting means for preventing the bolt and plate turning in relation to each other, the eccentric location of the bolt preventing the turning of the plate in its recess.

8. A saw comprising a handle having a slotted end, a blade in the slotted end of the handle, a bolt passing through the side pieces of the slotted portion of the handle and through the blade, the handle having a circular recess on one face, a circular plate adapted to rotate in the recess in the handle, the plate having a rectangular perforation eccentrically placed therein, the bolt having a rectangular portion to fit the perforation in the plate, the bolt thus locking the plate and itself against rotation and a nut on the bolt.

In testimony, that I claim the foregoing, I have hereunto set my hand this 21st day of November 1908.

ROBERT E. MARTIN.

Witnesses:
WM. H. CAMFIELD,
E. A. PELL.